(12) United States Patent
Shattil (10) Patent No.: US 7,010,048 B1
(45) Date of Patent: Mar. 7, 2006

(54) MULTIPLE ACCESS METHOD AND SYSTEM

(75) Inventor: Steven J. Shattil, Boulder, CO (US)

(73) Assignee: Aqvity, LLC, San Diego, CA (US)

( * ) Notice: Subject to any disclaimer, the term of this patent is extended or adjusted under 35 U.S.C. 154(b) by 0 days.

(21) Appl. No.: 09/381,588

(22) PCT Filed: Feb. 10, 1999

(86) PCT No.: PCT/US99/02838

§ 371 (c)(1),
(2), (4) Date: Sep. 20, 1999

(87) PCT Pub. No.: WO99/41871

PCT Pub. Date: Aug. 19, 1999

Related U.S. Application Data (63) Continuation-in-part of application No. 09/022,950, filed on Feb. 12, 1998, now Pat. No. 5,955,992.

(51) Int. Cl.
H04B 1/69 (2006.01)
H04L 27/00 (2006.01)

(52) U.S. Cl. .................................... 375/259; 375/130

(58) Field of Classification Search ................ 375/130, 375/140, 146, 147, 295, 316, 219, 259
See application file for complete search history.

(56) References Cited

U.S. PATENT DOCUMENTS

| | | | |
|---|---|---|---|
| 4,628,517 A | 12/1986 | Schwartz | |
| 4,827,480 A | 5/1989 | Kowalski | |
| 4,912,422 A * | 3/1990 | Kobayashi et al. | 329/306 |
| 5,003,545 A | 3/1991 | Kowalski | |
| 5,249,201 A * | 9/1993 | Posner et al. | 375/295 |
| 5,504,783 A * | 4/1996 | Tomisato et al. | 375/267 |
| 5,519,692 A | 5/1996 | Hershey | |
| 5,521,937 A | 5/1996 | Kondo | |
| 5,563,906 A * | 10/1996 | Hershey et al. | 375/130 |
| 5,691,832 A * | 11/1997 | Liedenbaum et al. | 359/115 |
| 5,815,801 A * | 9/1998 | Hamalainen et al. | 455/63.1 |
| 5,931,893 A * | 8/1999 | Dent et al. | 708/422 |

(Continued)

OTHER PUBLICATIONS

Linnartz, "Synchronous MC-CDMA in Dispersive Mobile Rayleigh Channels," Proc. $2^{nd}$ IEEE Benelux Sig. Proc. Symposium, Hilvarenbeek, Mar. 23, 2000.

(Continued)

Primary Examiner—Kevin Burd (57) ABSTRACT

A wireless communication system transmits data on multiple carriers simultaneously to provide frequency diversity. Carrier interference causes a narrow pulse in the time domain when the relative phases of the multiple carriers are zero. Selection of the frequency separation and phases of the carriers controls the timing of the pulses. Both time division of the pulses and frequency division of the carriers achieves multiple access. Carrier interferometry is a basis from which other communication protocols can be derived. Frequency hopping and frequency shifting of the carriers does not change the pulse envelope if the relative frequency separation and phases between the carriers are preserved. Direct sequence CDMA signals are generated in the time domain by a predetermined selection of carrier amplitudes. Each pulse can be sampled in different phase spaces at different times. This enables communication in phase spaces that are not detectable by conventional receivers. The time-dependent phase relationship of the carriers provides automatic scanning of a beam pattern transmitted by an antenna array. In waveguide communications, the carrier frequencies and phase space may be matched to the chromatic dispersion of an optical fiber to increase the capacity of the fiber.

91 Claims, 7 Drawing Sheets

U.S. PATENT DOCUMENTS

| | | | |
|---|---|---|---|
| 5,960,032 A | 9/1999 | Letaief | |
| 6,088,351 A * | 7/2000 | Jenkin et al. | 370/347 |
| 6,097,712 A | 8/2000 | Secord | |
| 6,128,276 A | 10/2000 | Agee | |
| 6,175,551 B1 * | 1/2001 | Awater et al. | 370/210 |
| 6,192,068 B1 | 2/2001 | Fattouche | |
| 6,252,909 B1 * | 6/2001 | Tzannes et al. | 375/260 |
| 6,331,837 B1 * | 12/2001 | Shattil | 342/378 |
| 2002/0009096 A1 * | 1/2002 | Odenwalder | 370/441 |

OTHER PUBLICATIONS

Yee, "Controlled Equalization of Multi-Carrier CDMA in an Indoor Rician Fading Channel," IEICE Trans. on Comm., Japan, vol. E77-B, No. 7 Jul. 1994.

Yee, "Wiener Filtering of Multi-Carrier CDMA in a Rayleigh Fading Channel," IEEE/ICCC PIMRC Conference, Hague, vol. 4, pp 1344-1347 Sep. 19-23, 1994.

Yang, "Blind Joint Soft-Detection Assisted Slow Frequency-Hopping Multi-Carrier DS-CDMA," IEEE Trans. Comm., vol. 48, No. 9, Sep. 2000.

Hara, "Overview of Multicarrier CDMA," IEEE Communications Mag., Dec. 1997.

Frenger, "A Parallel Combinatory OFDM System," IEEE Trans. Comm., vol. 47, No. 04, Apr. 1999.

Saulnier, "Performance of an OFDM Spread Spectrum Comm. System Using Lapped Transforms," IEEE, 1997.

Chang, "Wavelet-Based Multi-Carrier CDMA for Personal Comm. Systems," IEEE, 1996.

Yee, "Multicarrier Code Division Multiple Access (MC-CDMA): A New Spreading Technique for Comm. over Multipath Channels," Final Report for Micro Project 93-101.

Xu, "Performance of Multicarrier DS CDMA Systems in the Presence of Correlated Fading," IEEE, 1997.

Sourour, "Performance of Orthogonal Multicarrier CDMA in a Multipath Fading Channel," IEEE Trans. Comm., vol. 44, No. 3, Mar. 1996.

Kowalski, "Optical pulse generation with a frequency shifted feedback laser," Appl. Phys. Lett. 53(9), Aug. 29, 1988.

Kowalski, "Pulse generation with an acousto-optic frequency shifter in a passive cavity," Appl. Phys. Lett. 50(12), Mar. 23, 1987.

Bonnet, "Dynamics of self-modelocking of a titanium-saphire laser with intracavity frequency shifted feedback," Optics Comm. 123 (1996) Feb. 01, 1996.

Bingham, "Multicarrier Modulation for Data Transmission: An Idea Whose Time has Come," IEEE Communications Mag., May 1990.

Slimane, "MC-CDMA with Quadrature Spreading over Frequency Selective Fading Channels," IEEE, 1997.

Yee, "Multicarrier CDMA in Indoor Wireless Radio Networks," IEICE Trans. on Comm., Japan, vol. E77-B, No. 7, Jul. 1994.

* cited by examiner

MULTIPLE ACCESS METHOD AND SYSTEM

This is a 371 of PCT application Ser. No. PCT/US99/02838, filed Feb. 10, 1999, which is a continuation-in-part of U.S. patent application Ser. No. 09/022,950, filed Feb. 12, 1998, now U.S. Pat. No. 5,955,992.

FIELD OF THE INVENTION

The present invention relates to a novel multicarrier spread-spectrum protocol for wireless and waveguide communications and radar.

BACKGROUND OF THE INVENTION

Multipath fading is the fluctuation in a received signal's amplitude. It is caused by interference between two or more versions of the transmitted signal that arrive at a receiver at different times. This interference results from reflections from the ground and nearby structures. The amount of multipath fading depends on the intensity and propagation time of the reflected signals and the bandwidth of the transmitted signal. The received signal may consist of a large number of waves having different amplitudes, and phases, and angles of arrival. These components combine vectorally at the receiver and cause the received signal to fade or distort.

The fading and distortion change as the receiver and other objects in the radio environment move. These multipath effects depend on the bandwidth of the signal being transmitted. If the transmitted signal has a narrow bandwidth (i.e., the duration of the data bits transmitted is longer than the delay resulting from multipath reflections), then the received signal exhibits deep fades as the receiver moves in a multipath environment. This is known as flat fading. A significant amount of power control (e.g. increasing the transmit power and/or the receiver gain) is needed to compensate for deep fades. In addition, low data-rate signals experience distortion if the characteristics of the radio environment change significantly during the duration of a received data bit. The distortion is caused when movement of the receiver or nearby objects results in a Doppler frequency shift of the received signal that is comparable to or greater than the bandwidth of the transmit signal.

A wideband signal transmitted in a multipath environment results in a frequency-selective fade. The overall intensity of the received signal has relatively little variation as the receiver moves in a multipath environment. However, the received signal has deep fades at certain frequencies. If the duration of the data bits is smaller than the multipath delay, the received signals experience intersymbol interference resulting from delayed replicas of earlier bits arriving at the receiver.

Frequency Division Multiple Access (FDMA) typically suffers from flat fading whereas multicarrier protocols, such as Orthogonal Frequency Division Multiplexing (OFDM), suffer from frequency-selective fading. CDMA typically suffers from both; however the direct sequence coding limits the effects of multipath to delays less than the chip rate of the code. Also, CDMA's capacity is limited by multi-user interference. Improved CDMA systems use interference cancellation to increase capacity; however, the required signal processing effort is proportional to at least the cube of the bandwidth. Furthermore, CDMA is susceptible to near-far interference, and its long pseudo-noise (PN) codes require long acquisition times. For these reasons, OFDM has been merged with CDMA.

OFDM has a high spectral efficiency (the spectrum of the subcarriers overlap) and combats frequency-selective fading. However, the amplitude of each carrier is affected by the Rayleigh law, hence flat fading occurs. Therefore, good channel estimation with an appropriate detection algorithm and channel coding is essential to compensate for fading. The performance of OFDM frequency diversity is comparable to the performance of an optimal CDMA system's multipath diversity (which requires a Rake receiver). Because diversity is inherent in OFDM, it is much simpler to achieve than in an optimal CDMA system. An OFDM system benefits from a lower-speed parallel type of signal processing. A Rake receiver in an optimal CDMA system uses a fast serial type of signal processing, which results in greater power consumption. In addition, the OFDM technique simplifies the channel estimation problem, thus simplifying the receiver design.

In multicarrier CDMA, a spreading sequence is converted from serial to parallel. Each chip in the sequence modulates a different carrier frequency. Thus, the resulting signal has a PN-coded structure in the frequency domain, and the processing gain is equal to the number of carriers. In multi-tone CDMA, the available spectrum is divided into a number of equiwidth frequency bands that are used to transmit a narrowband direct-sequence waveform.

Frequency-hopping spread spectrum can handle near-fir interference well. The greatest benefit is that it can avoid portions of the spectrum. This allows the system to better avoid interference and frequency-selective fades. Disadvantages include the requirement for complex frequency synthesizers and error correction.

Time hopping has much higher bandwidth efficiency compared to direct sequence and frequency hopping. Its implementation is relatively simple. However, it has a long acquisition time and requires error correction.

U.S. Pat. Nos. 5,519,692 and 5,563,906 describe geometric harmonic modulation (GHM) in which preamble and traffic waveforms are created from multiple carrier frequencies (tones). The waveforms comprise tones incorporating a binary phase code where signal phases are 0 or $-\pi/2$. The binary phase offsets, which are applied to the tones, provide the spreading codes. Orthogonality of GHM signals is realized upon correlation with a reference signal at a receiver. A preamble carrier waveform is constructed by summing the tones. Therefore, the preamble signals are similar to MC-CDMA signals.

Each receiver monitors the preamble signals for its own phase code and then despreads and decodes the appended traffic waveforms. The traffic waveforms are products of the tones. The receiver generates a reference waveform from a product of tones having phase offsets that correspond to the receiver's phase code. The reference waveform is correlated with the received signals to produce a correlation result that is integrated over the data-bit duration and over all tones.

GHM uses binary phase offsets instead of differential phase offsets. Thus, GHM does not provide carriers with phase relationships that enable the superposition of the carriers to have narrow time-domain signatures. Consequently, received GHM signals require processing by a correlator, whereas signals that are orthogonal in time can be processed using simpler signal-processing techniques, such as time sampling and weight-and-sum. Furthermore, GHM does not achieve the capacity and signal-quality benefits enabled by time-orthogonal signals.

U.S. Pat. No. 4,628,517 shows a radio system that modulates an information signal onto multiple carrier frequencies.

Received carriers are each converted to the same intermediate frequency using a bank of conversion oscillators. The received signals are then summed to achieve the benefits of frequency diversity. In this case, frequency diversity is achieved at the expense of reduced bandwidth efficiency. The process of converting the received signals to the same frequency does not allow orthogonality between multiple information signals modulated on the same carriers.

Each communications protocol presents different benefits and disadvantages. Benefits can be increased by merging different protocols, but only to a limited degree. There is a need for a protocol that solves all or most problems, especially those associated with fading.

SUMMARY OF THE INVENTION

The principle object of the present invention is to provide a protocol that achieves the combined benefits of the previously mentioned protocols. Another object is to present a spread-spectrum protocol that is specifically designed for mobile communications. These objects are accomplished by interferometry of multiple carriers. The protocol enabled by the present invention is Carrier Interference Multiple Access (CIMA). In CIMA, the frequency and phase of each carrier is selected so that the superposition of the signals results in a pulse (constructive interference resulting from a zero-phase relationship between the carriers) that occurs in a specific time interval. The resulting signal has side lobes whose amplitudes are far below the amplitude of the pulse. Thus, orthogonality is achieved in the time domain.

Because the carriers exist within the time interval where superposition yields a negligible signal level, it can be concluded that the pulse exists in a different phase space. This phase space is defined as a time (phase) offset between the carriers. The offset enables the pulse to be observed in a specific time interval. A receiver tuned to multiple phase spaces can generate multiple samples of the CIMA signal. Thus, CIMA enables signals to be processed simultaneously as both low and high data-rate signals. This mitigates the multipath problems inherent in both classes of signals and enables the system to function with substantially reduced signal power levels. Furthermore, if the CIMA carriers are pulse-amplitude modulated such that the superposition does not result in a pulse in zero-phase space, then the CIMA signals are visible only to CIMA receivers tuned to a nonzero-phase space. Conventional radio receivers can not detect these signals.

In a dispersive medium, such as an optical fiber, the phase space of a CIMA transmission may be selected to match the chromatic dispersion along a predefined length of the medium. The effect of the dispersion is that the phases of the carriers align, resulting in a pulse occurring in the medium at a predefined position.

The time-dependent nature of CIMA phase space also enables automatic scanning of an antenna array's beam pattern. If each element of an antenna array transmits a CIMA carrier, the array's beam pattern scans with a period that depends on the frequency spacing of the carriers and the separation between the antenna elements.

CIMA may be used to create any of the protocols previously mentioned. It is an objective of the present invention to provide methods and apparatus for transmitting and receiving CIMA signals. To this end, the following objectives are achieved:

An objective of the invention is to reduce the effects of multipath fading and interference. A consequence of this objective is the reduction in required transmission power.

Another objective is to provide secure communications by creating transmissions that are difficult to intercept because they are nearly impossible to detect. The low power requirements of the carriers and the transmission of the carriers in nonzero-phase spaces accomplish this.

Another objective of the invention is to reduce interference to other systems and minimize the susceptibility of the communication system to all types of radio interference.

Another objective of the invention is to minimize and compensate for co-channel interference that occurs when the communication system serves multiple users.

Another objective is to provide a spread-spectrum communication protocol that is not only compatible with adaptive antenna arrays, but enables substantial advances in antenna-array technologies.

Another objective is to enable a spread-spectrum communication system to have the performance benefits of a resource-limited system, the capacity and graceful degradation benefits of an interference-limited system, and the ability to provide the benefits of both systems simultaneously. Further objectives and benefits of the invention will become apparent in the Description of the Preferred Embodiments.

DESCRIPTION OF THE PREFERRED EMBODIMENTS

Figure 1:
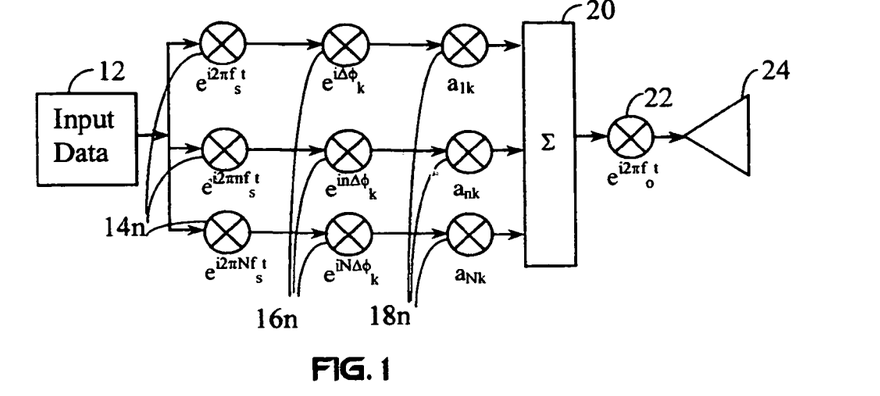
FIG. 1 is a schematic of a transmitter that generates CIMA signals.

FIG. 1 shows a flow diagram of a CIMA transmitter that converts a baseband information signal for a single user k to a CIMA signal for transmission. Data received from an input data source 12 modulates a number N of CIMA carriers, which have different carrier frequencies. This modulation occurs at a plurality of carrier mixers 14n. In this case, the frequencies of the CIMA signals are incrementally spaced by a shift frequency $f_s$. However, non-uniform spacing of the frequencies may also be used to achieve specific benefits described in U.S. patent application Ser. No. 09/022,950, which is incorporated herein by reference. The carrier frequencies are typically chosen to be orthogonal to each other:

$$\int_0^{T_C} \cos(\omega_i t + \phi_i)\cos(\omega_j t + \phi_j)\,dt = 0$$

where $T_c$ is the chip duration, $\omega_i$ and $\omega_j$ are the $i^{th}$ and $j^{th}$ carrier frequencies, and $\phi_i$ and $\phi_j$ are arbitrary phases. A signal in the $j^{th}$ frequency band does not cause interference in the $i^{th}$ frequency band. However, orthogonality of the waveforms is not required if the signals transmitted are resource limited.

The phase of each CIMA signal is set with respect to a predetermined receiver time interval and phase space in which the CIMA signals constructively combine when received by a CIMA receiver. An incremental phase offset of $e^{in\Delta\phi}{}_k$ is applied to each CIMA carrier by one of a plurality N of user-interval delay systems 16n. Each CIMA carrier has its gain adjusted by an amplitude-control system 18n. The amplitude control 18n provides a gain profile to the CIMA signals. This profile may include a tapered-amplitude window with respect to the frequency domain, compensation for flat fading of CIMA carriers in the communications channel, and pulse-amplitude modulation of the CIMA carriers (which limits the existence of the carriers to temporal regions near a predetermined receiver time interval for each carrier). The gain-adjusted CIMA signals are summed by a combining system 20. A frequency converter 22 may be used to convert the CIMA signals to the appropriate transmit frequencies, which are conveyed to a output coupler 24.

The output coupler 24 is any device that couples CIMA transmit signals into a communications channel from which CIMA signals are received by a receiver. For radio communications, the output coupler 24 may include one or more antenna elements (not shown). For optical communications, the output coupler 24 may be a lens or simple coupling element that couples light into an optical fiber. Although this diagram illustrates the generation of CIMA transmission signals as step-by-step procedures, a preferred embodiment for accomplishing these processes is to use digital signal-processing techniques, such as Discreet Fourier Transforms.

Figure 2:
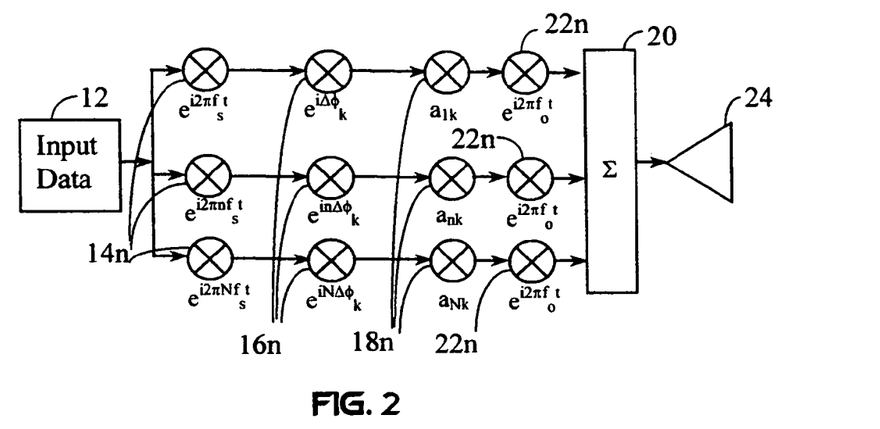
FIG. 2 is a second embodiment of a transmitter that generates CIMA signals.

The order of some of these processes may be switched. For example, modulation of each CIMA carrier by the input data may be the final step before combining. FIG. 2 shows a flow diagram for generating CIMA signals. Each of these processes is similar to the processes shown in FIG. 1. The difference between the diagrams is that in FIG. 2, the CIMA signals are not combined until they are transmitted into the communications channel. An illustration of this is shown in FIG. 3.

Figure 3:
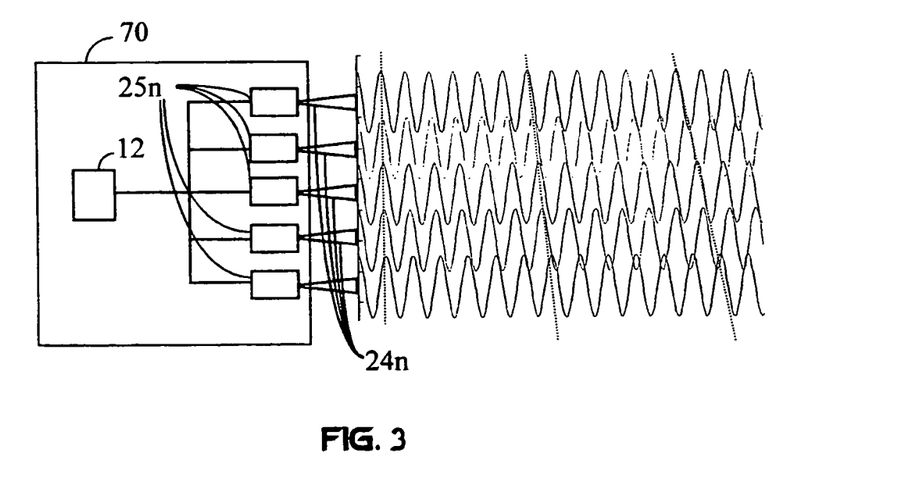
FIG. 3 is a schematic of a transmitter that generates CIMA carriers emitted by an antenna array.

FIG. 3 shows a data stream from the data source 12 being used to modulate a plurality of CIMA carriers at a plurality of mixers 25n. A CIMA carrier with a specific frequency, phase relationship and gain profile is input to each mixer 25n. Each bit from the data source 12 modulates all of the CIMA carriers. Each mixer 25n is connected to one of a plurality of antenna-array elements 24n; thus, each antenna element 24n transmits only one CIMA carrier. Although the collection of CIMA carriers has data redundancy due to the same bit being modulated onto multiple carriers, the frequency and phase relationships between the carriers cause orthogonality in time (illustrated by the Inverse Fourier Transform of the CIMA carriers in the frequency domain). This orthogonality negates the typical decrease in bandwidth efficiency caused by data redundancy and retains the benefits of frequency diversity. The orthogonality results from constructive and destructive interference between the CIMA carriers. Constructive interference causes narrow time-domain pulses with a repetition rate proportional to the inverse of the carrier-frequency spacing $f_s$.

Figures 4, 11:
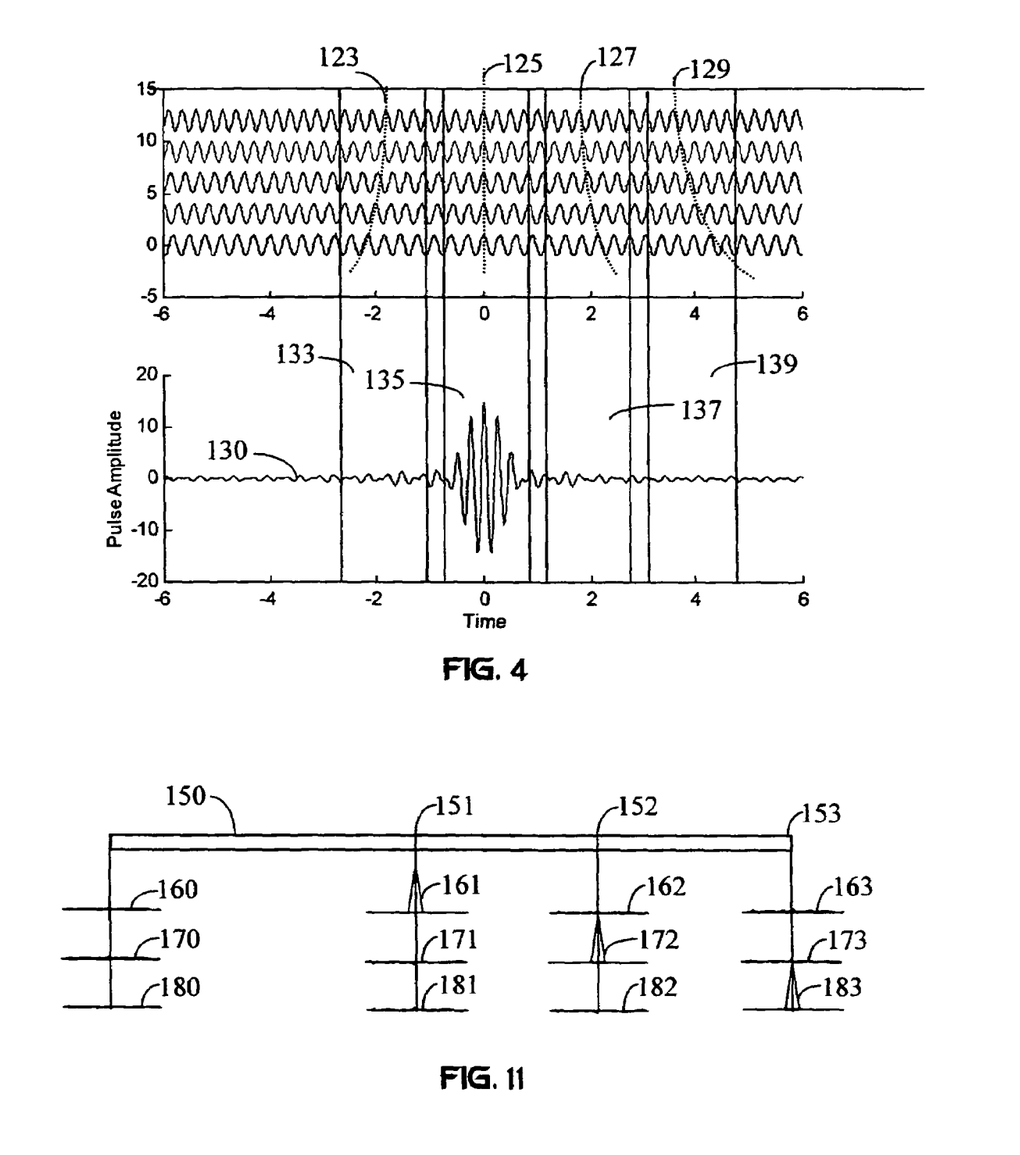
FIG. 4 is a plot of a plurality of CIMA carriers and a superposition of the carriers.
FIG. 11 shows different CIMA signals as they propagate down an optical fiber where the phase offsets of the carriers are matched to the chromatic dispersion properties of the fiber.

FIG. 4 illustrates how the phase fronts of CIMA carriers are aligned at a specific time. At other times, the carriers combine destructively resulting in undetectable signal levels. A composite signal 130 results from the summation of the carriers. The composite signal 130 shows a pulse envelope occurring in a predetermined time interval 135. In the case where there is no amplitude tapering (i.e., a rectangular window) and the CIMA carriers are uniformly spaced in frequency, a composite CIMA signal is:

$$e(t) = \sum_{n=1}^{N} e^{i[(\omega_c + n\omega_s)t + n\Delta\phi]}$$

which has a magnitude of:

$$|e(t)| = \left|\frac{\sin(N(\omega_s t + \Delta\phi)/2)}{\sin((\omega_s t + \Delta\phi)/2)}\right|$$

The CIMA signals are periodic with period $1/f_s$ for odd number of carriers N and with period $2/f_s$ for even number of carriers N. The main lobe has duration $2/Nf_s$ and the N–2 side lobes each has a duration $1/Nf_s$. The amplitude of the $1^{th}$ side lobe with respect to the main lobe amplitude is:

$$A(l) = \frac{1}{N\sin(\pi(l+1/2)/N)}$$

Because the period and width of the pulse envelope depends on the amplitude, phase, and frequency separation of the CIMA carriers, the frequency of each carrier may be changed without affecting the pulse envelope as long as the amplitude, phase, and frequency separation are preserved. Thus, frequency hopping and frequency shifting of the carriers does not affect the temporal characteristics of the composite signal 130. Providing a tapered amplitude distribution to the CIMA carriers broadens the main lobe width and reduces the amplitude of the side lobes.

Figure 5A:
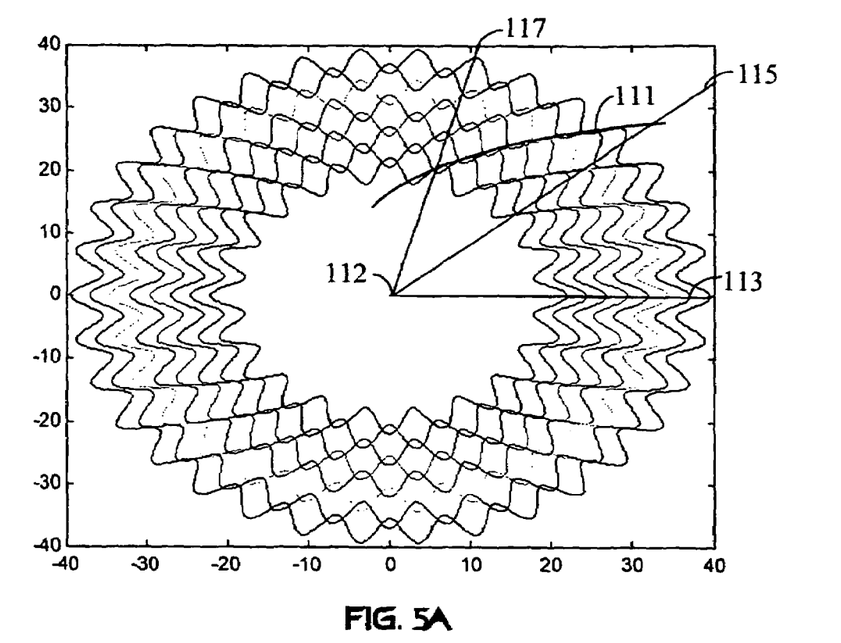
FIG. 5A is a plot of eight CIMA carriers that shows the relative phases between the carriers as a function of time and illustrates the phase spaces represented by the relative phases.
Figure 5B:
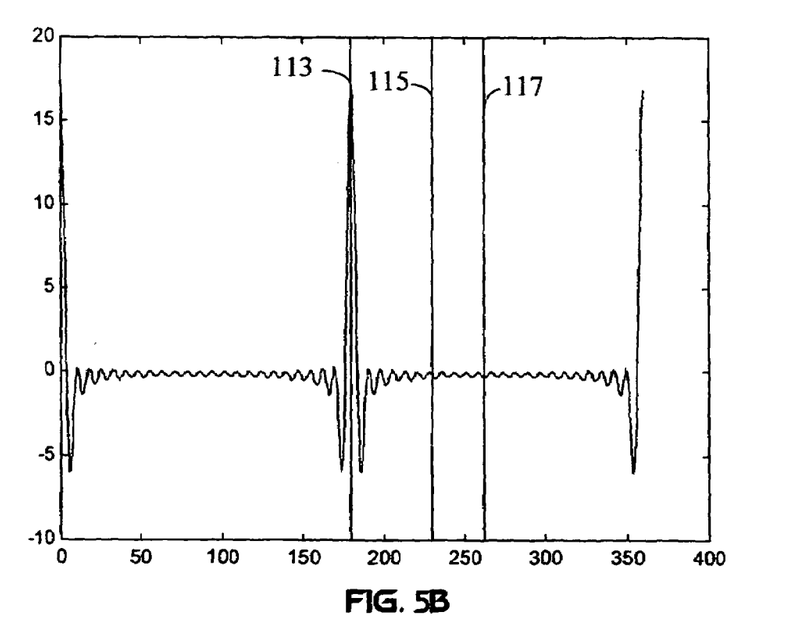
FIG. 5B is a time-domain plot of a superposition of the carrier signals shown in FIG. 5A.
Figure 6:
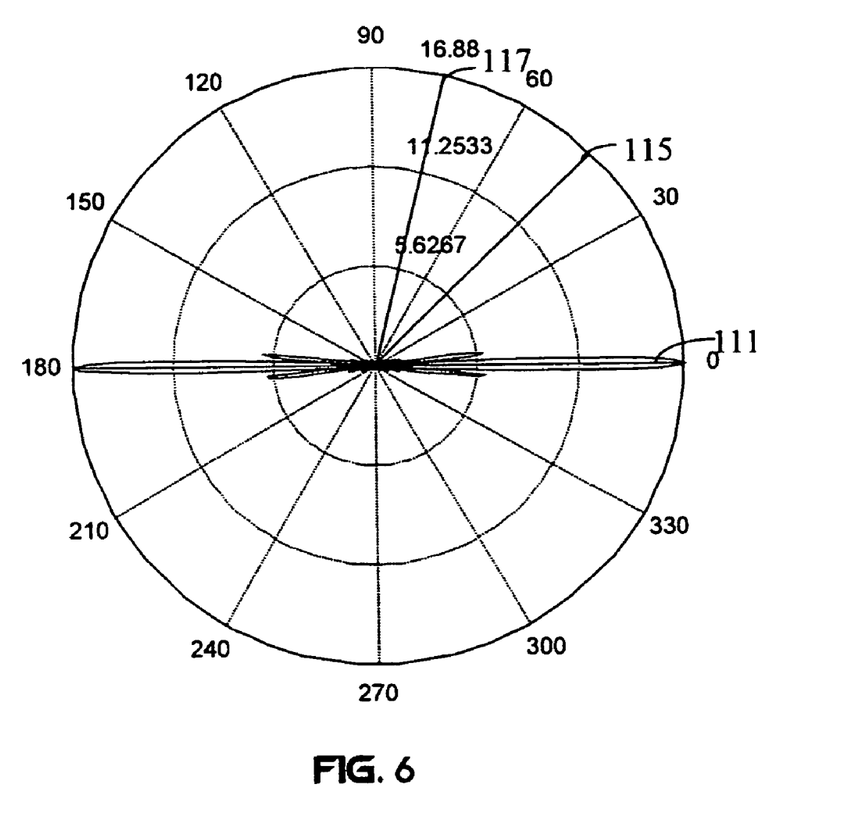
FIG. 6 is a polar plot in time of a superposition of the carriers shown in FIG. 5A.

FIG. 5A illustrates the phase space of the carriers shown in FIG. 4. As time moves forward, the phase relationship between the CIMA carriers changes. A straight line 113 indicates a zero-phase relationship between the carriers. The sum of the carriers are viewed in a specific phase space. A pulse occurs when there is a zero-phase relationship between all the carriers, yet the carriers can exist in other time domains even if no pulse is visible. When the pulse moves into this phase space (which it does as a periodic function of time), the pulse becomes visible. Zero-phase is the phase space in which all conventional receivers operate. This phase space is illustrated by the sum of carrier amplitudes along any straight line that rotates about a fixed point 112. The sum of the amplitude of the waves along the line 113 as it rotates is shown in FIG. 5B and in a polar plot illustrated by FIG. 6.

In FIG. 5A, a curved line 111 illustrates one of the many phase spaces in which a pulse may be observed. This phase space 111 occurs within a time interval that is bounded by lines 115 and 117. In this time interval, the amplitude of the composite signal 130 (shown in FIG. 5B) is negligible. However, a receiver may tune to a specific phase space by selectively delaying each of the received carriers by a predetermined amount before summing the carriers. In this way, a receiver may detect a pulse that is otherwise invisible in zero-phase.

Figure 7:
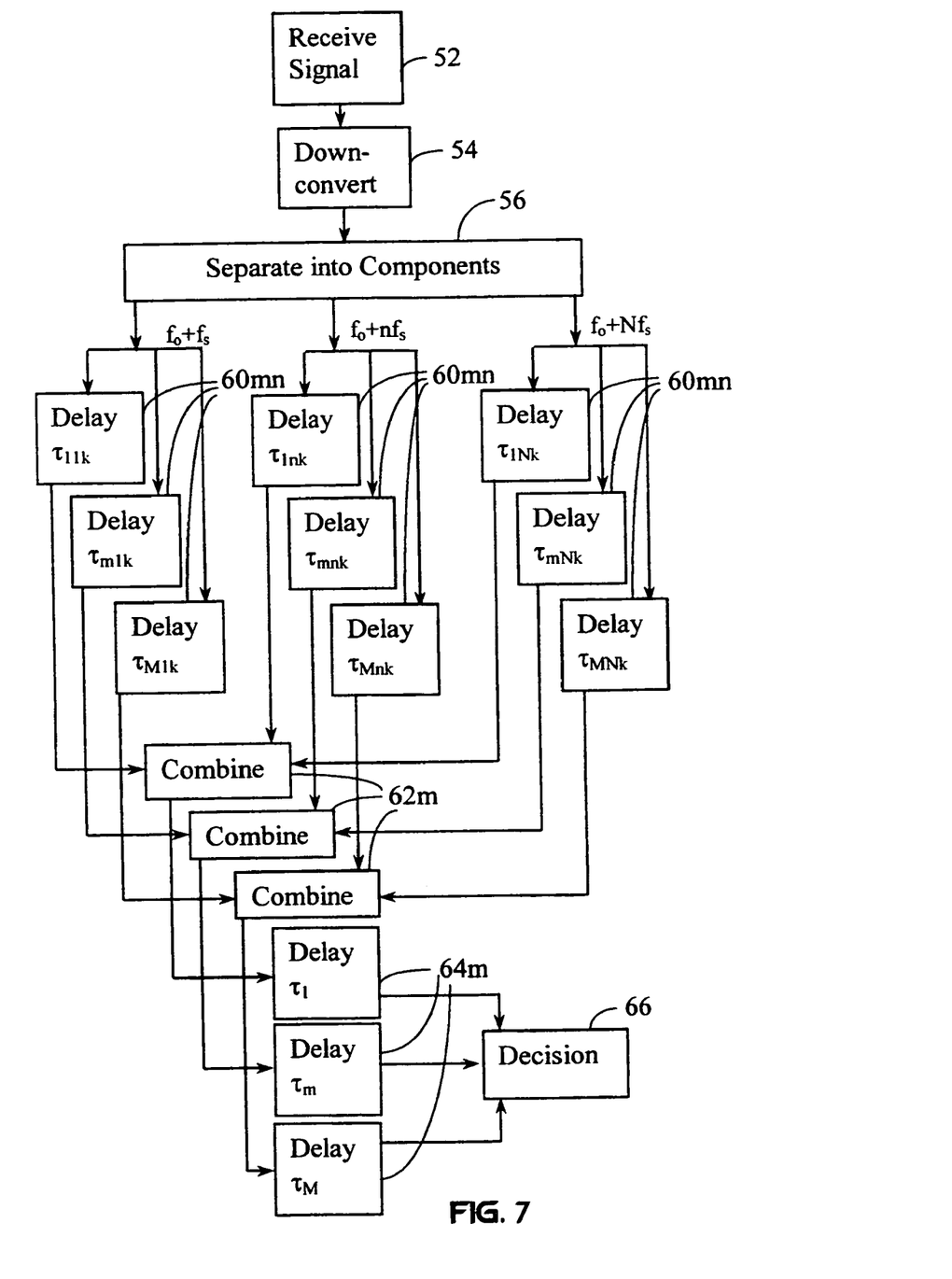
FIG. 7 is a flow diagram for a receiver that receives a CIMA signal and samples the signal in multiple phase spaces.

FIG. 7 shows a single-user phase-space receiver that is capable of sampling in multiple phase spaces. A received CIMA signal is detected from the communications channel by a receiving element 52 and down-converted by a mixer 54 before being separated into its N component carriers by a frequency filter 56. Depending upon how the transmit signal may have been altered by the communications channel, one of a plurality of gain compensators (not shown) may apply a gain compensation to each component n. Then each gain-compensated component is split into a number M of delay components, each of which is delayed by a phase-space delay compensator 60$mn$. The output of each m-numbered delay component is summed at a combining step 62 to reconstruct pulses observed in other phase spaces. Each pulse may be delayed at a delay step 64$m$ to synchronize the pulses before being summed in a decision step 66 that outputs an estimate of the original transmit signal. In practice, the delay step 64$m$ may be integrated into the decision step 66.

This receiver obtains multiple samples of the pulse because it tracks the pulse through different phase spaces. Thus, the receiver benefits from the relatively slow data rate (i.e., pulse period) of the CIMA carriers which combine to create the pulses. This remedies the multipath problem of intersymbol interference. The short duration of each pulse allows the receiver to avoid the fading and distortion problems inherent in systems that receive slowly varying signals and the flat fading associated with narrowband signals. Although the pulse is comprised of many narrowband CIMA carriers, flat fading (which causes very deep fades) is avoided because the CIMA pulse depends on the interference pattern between a large number of CIMA carriers. Furthermore, if the number of and spacing between the CIMA carriers are appropriately chosen, it is unlikely that more than one CIMA carrier is located in a deep fade. Thus, frequency diversity is achieved.

Each user k can share the communication resource through a unique selection of the phase offset (i.e., timing offset) while employing the same carriers as other users. If N orthogonal carriers are shared by each user k, then N users may use the resource without co-channel interference. In this case, there is a unique combination of phase space with respect to time for each user k. Similarly, users employing different CIMA carriers may use the same phase space with respect to time without co-channel interference. Because the pulse characteristics depend on the frequency and phase relationships between the CIMA carriers, the frequency and phase of each CIMA signal may be changed without altering the characteristics of the pulse envelope as long as those relationships between the CIMA carriers remain unchanged. This enables a transmitter to frequency hop to avoid interference or enhance security.

Figure 8:
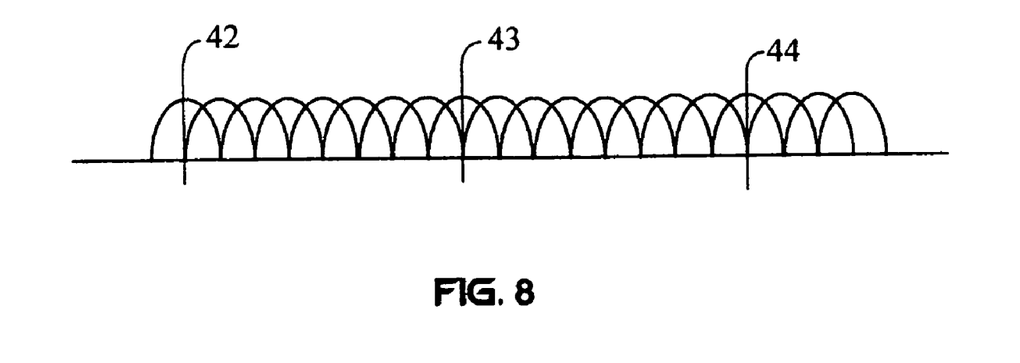
FIG. 8 shows part of a frequency profile for a group of CIMA carriers.
Figure 9A:
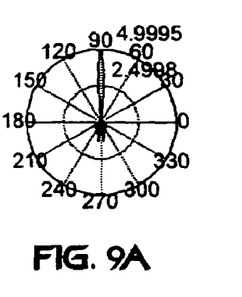
FIGS. 9A through 9I shows a beam pattern produced by the transmitter in FIG. 3 at different times.
Figure 9B:
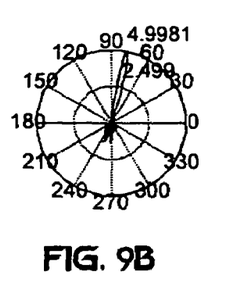
Figure 9C:
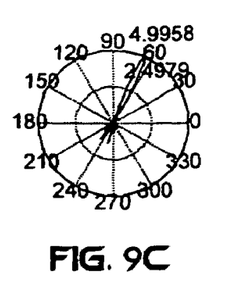
Figure 9D:
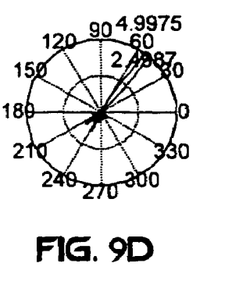
Figure 9E:
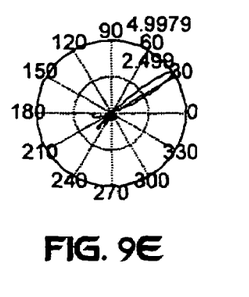
Figure 9F:
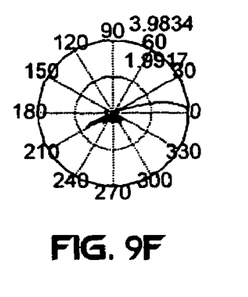
Figure 9G:
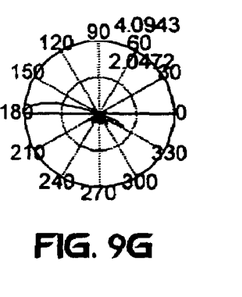
Figure 9H:
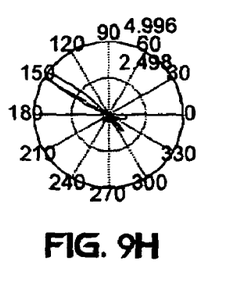
Figure 9I:
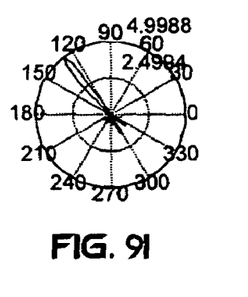
Figure 9J:
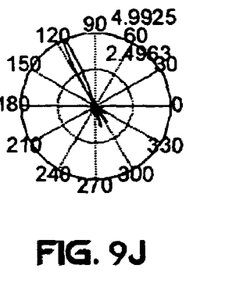
Figure 9K:
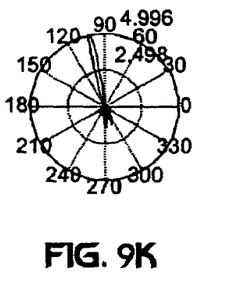
Figure 9L:
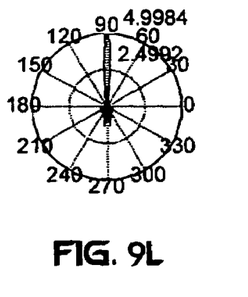

Separation $f_s$ between the CIMA carriers for each user may be selected as shown in FIG. 8 such that it exceeds the coherence bandwidth (i.e., the inverse of the multipath duration). This results in frequency nonselective fading over each carrier. If the adjacent CIMA carriers overlap in frequency by 50%, the system capacity increases by two-fold above the classical limitation imposed by non-overlapping carriers. Such a system does not have independent channel-fading characteristics over each carrier. However, CIMA carriers do not need to be adjacent in frequency. The system can attain N-fold frequency-diversity gain by using a subset of carrier frequencies for each set of users such that the carrier separation $f_s$ for each user k exceeds the coherence bandwidth. For example, in the frequency profile shown in FIG. 8, a set of nonadjacent carrier frequencies 42, 43, and 44 may be selected for a particular group of users. This frequency profile allows both time offsets and frequency division multiplexing to optimize bandwidth efficiency. If the bandwidth of each carrier is small compared to the carrier separation $f_s$, unauthorized interception of the CIMA signal by a broadband receiver is more difficult. The amount of background noise received by a receiver depends on the bandwidth of the receiver. A CIMA receiver may be tuned to receive CIMA carriers at predetermined narrow bands in which the signal-to-noise ratio (SNR) is relatively large. However, a broadband receiver receives noise components in the spectrum between the CIMA carriers, resulting in a low SNR.

If the number of users k exceeds the number of CIMA carriers N, the timing offset of each user k can be selected to position the CIMA pulses to minimize the mean square cross correlations between the pulses. User signals may also be positioned relative to the type and priority of each user's communication channel. This ensures quality of service for specific users or types of transmissions. This also provides the quality of a resource-limited system when the number of users is at or below the classical limit of a resource-limited system and provides interference-limited operations when demand exceeds the classical limit.

Although the receiver shown in FIG. 7 is described as a single-user receiver, a preferred mode of operation is multi-user detection. Unlike direct-sequence CDMA where each user contributes noise to every other user's communication channel, CIMA limits multi-user interference to user signals (pulses) that are nearby in the time domain. In the preferred mode of operation, the receiver samples adjacent user signals in as few as two neighboring user time intervals. Then it performs a weight and sum in the decision step 66 to cancel those contributions to the intended user's signal.

The separation d between the antenna elements 24$n$ of the transmitter 70 (shown in FIG. 3) results in an azimuthal variation of the beam pattern produced by the array 24$n$ due to the time-dependent phase-space characteristic of the CIMA signal. In other words, as the phase space of the CIMA signals changes with time, the beam pattern of the array 24$n$ scans. The time dependence of the beam pattern's directionality is shown by the following beam-pattern equation:

$$D(t) = \sum_{n=1}^{N} a_n \cos((\omega_o + n\omega_s)t + 2\pi nd\sin\vartheta/\lambda_n)$$

where $a_n$ is the amplitude of each CIMA carrier, $\omega_o + n\omega_s$ is the radial frequency of the $n^{th}$ CIMA carrier, $\lambda_n$ is the CIMA carrier wavelength, $\theta$ is the azimuthal angle, and d is the separation between the array elements 24n. This characteristic of the CIMA beam pattern may further enhance the diversity benefits of CIMA. Prior art shows that changing the beam pattern of a transmitting antenna aids in diversity reception. Plots of the beam pattern equation D(t) are shown in FIGS. 9A through 9L for $d=\lambda_o/2$ and incremental values of time t. Different values for separation d result in changes to the number of main lobes and the rate at which they scan. Adjusting the frequency separation $f_s$ changes the directionality D(t).

Figure 10:
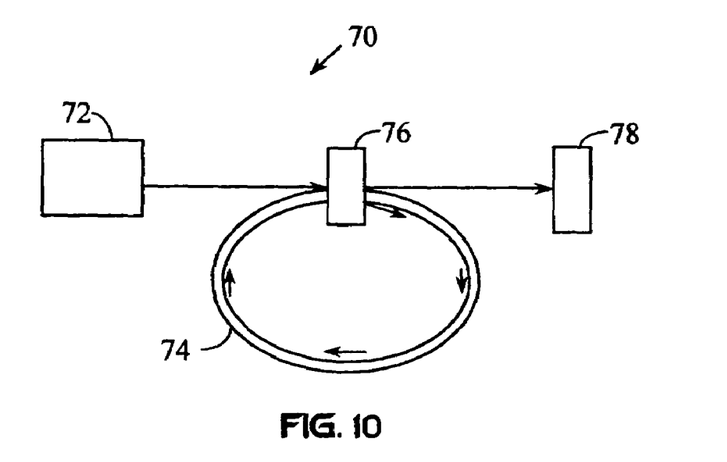
FIG. 10 is a frequency-shifted feedback cavity that includes a traveling-wave cavity and a frequency-shifting device through which optical signals are circulated.

FIG. 10 shows a frequency-shifted feedback cavity (FSFC) 70 that can be used to generate CIMA signals. A base-frequency generator 72 produces an optical base frequency $f_o$ signal from which frequency-shifted signals are created. The base-frequency signal is input to a travelling-wave cavity 74 that includes a frequency shifter 76. The frequency shifter 76 may be an acousto-optic modulator (AOM). As light circulates through the cavity 74, it is shifted in frequency by an amount $f_s$ each time it passes through the frequency shifter 76. The travelling-wave cavity 74 does not selectively attenuate frequencies. Rather, the oscillations it supports are characterized by an unusually broad spectral output, that has no mode structure. A portion of the light is output from the cavity to a multicarrier processor 78. For example, an AOM (not shown) diffracts light passing through it; the light is then fed back into the cavity 74. An undiffracted portion of the beam provides a convenient output. The output of the processor 78 is conveyed to an output coupler (not shown), for example, an antenna, a focusing element, or a connector to an optical fiber.

The output beam consists of multiple beams of incrementally delayed, frequency-shifted light. The amount of delay incurred by each output beam component is identified by the frequency of the component. If the cavity 74 does not cause the light to undergo a significant amount of chromatic dispersion, the amount of delay incurred by an output component is substantially proportional to the amount of frequency shift the beam has incurred. The multicarrier processor 78 may include diffractive optics to wavelength demultiplex the output components. If the base-frequency generator 72 modulates the optical base signal with an information signal, the output of the multicarrier processor 78 includes multiple delayed (and separated) versions of the modulated signal. Each of the delayed versions of the modulated signal may be used to modulate a transmit signal emitted by each of the antenna array elements 24n shown in FIG. 3. If each array element 24n emits a transmit signal having the same distribution of frequencies, the directionality of the beam pattern produced by the array 24n does not change in time. Rather, the directionality can be adjusted simply by changing the length of the travelling-wave cavity 74.

The FSFC 70 may also be used as a receiver for sampling received CIMA signals in nonzero-phase spaces. This requires that the frequency shift $f_s$ by the frequency shifter 76 match the frequency separation of the received CIMA signals. Light output from the FSFC 70 is separated by wavelength to identify the different phase-space samples of the received CIMA signal. These phase spaces will be substantially linear if the cavity 74 does not cause chromatic dispersion. Linear phase space sampling matches the phase spaces of the received signals provided that $f_o \gg N*f_s$.

The FSFC 70 shown in FIG. 10 may be used to generated CIMA signals for transmission through an optical fiber or waveguide. In this mode of operation, the frequency generator 72 produces an unmodulated optical base signal. The output of the travelling-wave cavity 74 is a collinear superposition of CIMA carriers and is easy to couple into an optical fiber. Thus, the multicarrier processor 78 does not separate the components. The multicarrier processor 78 modulates the CIMA signals with an information signal that has a predefined duration in the time domain. The timing and duration of the information signal can be chosen to compensate for chromatic dispersion of the CIMA carriers as they propagate through the fiber.

Chromatic dispersion occurs in an optical fiber as different wavelengths of light travel at different speeds. Optical fiber has different indices of refraction for different wavelengths of light. The speed of light in the material is inversely proportional to the index of refraction. In material dispersion, light with a long wavelength travels faster than light with a shorter wavelength. This causes distortion (broadening) of optical pulses transmitted through an optical fiber.

FIG. 4 shows the phase relationship between CIMA carriers as a CIMA signal propagates in a nondispersive medium. As the CIMA carriers propagate through space, CIMA pulses do not distort because the phase relationships between the carriers do not change except for their periodic relationship. For example, a receiver moving at the speed of the carriers detects no changes in the relative phase of the carriers. Another way of describing this is that two stationary receivers may be spaced apart by an integer number of pulse periods, and they detect the same phase relationships between the CIMA carriers. However, in a dispersive medium, the two stationary detectors detect different phase relationships because some of the carriers have traveled further in phase. The following equation shows the difference in wavelength between adjacent CIMA carriers:

$$\Delta\lambda = \frac{cf_s}{f_o(f_o + f_s)}$$

This is a nonlinear relationship in which the wavelength difference $\Delta\gamma$ between adjacent CIMA carriers increases as the wavelength of each carrier increases. This is illustrated by a phase profile 123 of carrier maxima in FIG. 4. The frequency separation $f_s$ is selected with respect to the dispersion characteristics of an optical fiber 150 to match the velocity profile of the carriers with their phase profile. Then portions of the carriers are selected to constructively combine to create CIMA pulses at predetermined locations along the fiber 150.

The CIMA carriers are pulse-amplitude modulated in a time interval 133 in which the phase profile 123 occurs. In that time interval 133, the composite signal 130 resulting from the sum of the carriers is negligible. As the carriers propagate through the fiber 150, the relative phases of the carriers change. During a later time interval 135, the carrier signal phases line up at a specific time 125, which results in constructive interference that causes a pulse to occur in the composite signal 130. At later time intervals 127 and 129, the low-wavelength carriers have traveled slightly farther, resulting in distorted phase profiles 137 and 139, respectively. The composite signal 130 in these time intervals returns to zero.

FIG. 11 shows a plurality of composite CIMA signals along a dispersive optical fiber 150. Three signals 160, 170, and 180 are input at one end of the fiber 150. The phase profile of the first signal 160 is selected such that the CIMA carriers combine constructively to produce a pulse 161 at a first node 151. The first CIMA carriers 160 combine destructively to produce low-level signals 162 and 163, at second and third nodes 152 and 153, respectively. Similarly, the carrier phases of the second signal 170 are selected to produce a constructively interfering signal 172 at the second node 152. Likewise, the carrier phases of the third signal 180 are selected to provide constructive interference 183 at the third node 153. By making use of the nonlinear dispersion of light in an optical fiber, it may be possible to expand the usable bandwidth of the optical fiber beyond classical limitations.

Figure 12A:
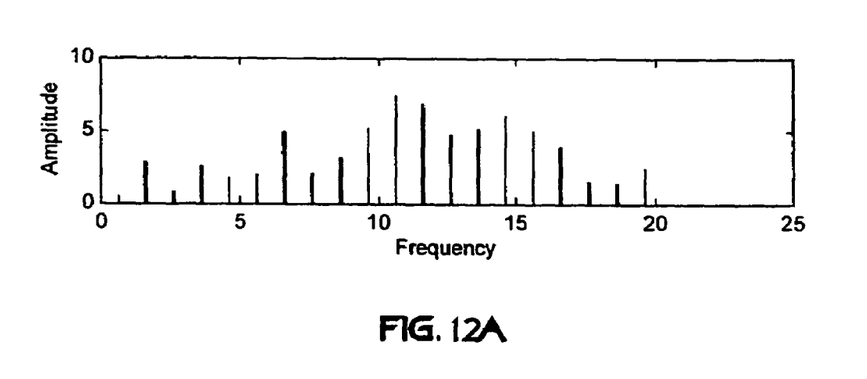
FIG. 12A is a plot of the relative frequency-versus-amplitude profile of CIMA carriers that generate a direct sequence CDMA chip sequence in the time domain.
Figure 12B:
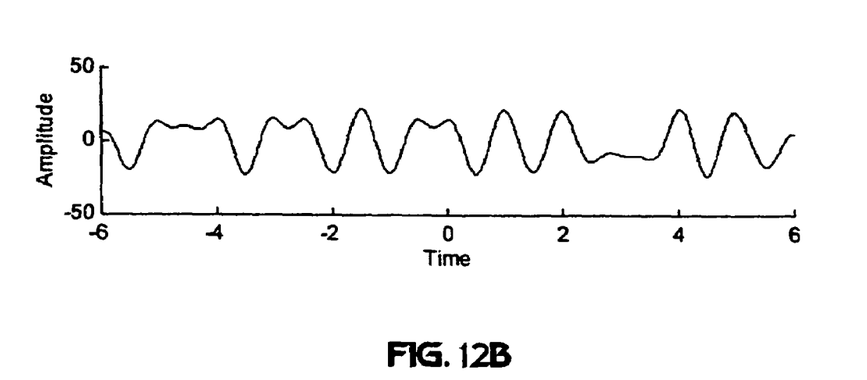
FIG. 12B is a time-domain representation of a direct sequence CDMA signal generated by the CIMA carriers shown in FIG. 12A.

FIG. 12A shows an amplitude distribution for twenty CIMA carriers. These carriers produce a combined signal shown in FIG. 12B consisting of a pseudo-random sequence of positive and negative CIMA pulses. Thus, a particular distribution of carrier amplitudes in the frequency domain results in a direct-sequence CDMA code that is periodic in the time domain. When CIMA signals are used as the basis for a CDMA system, the CDMA system gains the advantages of reduced multipath and intersymbol interference, increased capacity, and reduced co-channel interference. Because CIMA signals are sinc functions, they have high autocorrelation efficiency. The autocorrelation function falls off rapidly when synchronization is lost.

The preferred embodiments demonstrate a few of the many methods for generating and receiving CIMA signals. This was done to provide a basic understanding of the characteristics of CIMA. With respect to this understanding, many aspects of this invention may vary; for example, the methods used to create and process CIMA signals. It should be understood that such variations fall within the scope of the present invention, its essence lying more fundamentally with the design realizations and discoveries achieved than the particular designs developed.

The foregoing discussion and the claims that follow describe the preferred embodiments of the present invention. Particularly with respect to the claims, it should be understood that changes might be made without departing from the essence of the invention. In this regard, it is intended that such changes still fall within the scope of the present invention. To the extent such revisions utilize the essence of the present invention, each naturally falls within the breadth of protection encompassed by this patent. This is particularly true for the present invention because its basic concepts and understandings are fundamental in nature and can be broadly applied.

I claim:

1. A method of transmitting a Carrier Interference Multiple Access (CIMA) communication signal comprising generating (14n) a plurality of electromagnetic carrier signals having a plurality of frequencies and modulating (12) the carrier signals with at least one information signal, the method characterized by:

providing the carriers with at least one predetermined phase space (16n), each phase space mapping a data symbol to one of a plurality of pulse waveforms generated from a superposition of the carriers and centered at a predetermined instant in time, the pulse waveforms being positioned substantially orthogonally in time, and combining (24) the modulated, phase-offset carrier signals into at least one communication channel to generate interference between the modulated, phase-offset carrier signals for providing at least one transmitted CIMA signal having a plurality of multi-frequency carrier-signal components.

2. The method of transmitting a CIMA communication signal recited in claim 1 wherein generating (14n) a plurality of electromagnetic carrier signals includes generating a plurality of groups of carriers having identical sets of carrier frequencies, each group being assigned to one of a plurality of users, and providing the carriers with at least one predetermined phase space (16n) includes providing a unique relative phase to the carriers of each group to provide each group with a unique time offset.

3. The method of transmitting a CIMA communication signal recited in claim 1 wherein generating (14n) a plurality of electromagnetic carrier signals includes generating a plurality of groups of carriers, each group having a unique set of carrier frequencies and being assigned to at least one user, and providing the carriers with at least one predetermined phase space (16n) includes providing a relative phase to each group such that each of a plurality of users may receive constructive superpositions of signals in the same time interval but on different groups of carriers.

4. The method of transmitting a CIMA communication signal recited in claim 1 wherein generating (14n) a plurality of electromagnetic carrier signals is characterized by providing variations to the carrier frequencies with respect to time wherein the frequency variations for each carrier in a group of carriers corresponding to each user are substantially identical.

5. The method of transmitting a CIMA communication signal recited in claim 1 wherein modulating (12) the carrier signals comprises a pulse-amplitude modulation being applied to a plurality of the carriers, the pulse-amplitude modulation having a duration that is longer than a constructive-interference signal resulting from a superposition of the carriers, and combining (24) the modulated, phase-offset carrier signals into at least one communication channel provides for generating an interference signal between the modulated, phase-offset carrier signals having a duration that is longer than the constructive-interference signal.

6. The method of transmitting a CIMA communication signal recited in claim 1 wherein modulating (12) the carrier signals comprises a pulse-amplitude modulation being applied to a plurality of the carriers, the pulse-amplitude modulation having a duration that is shorter than a constructive-interference signal resulting from a superposition of the carriers, and combining (24) the modulated, phase-offset carrier signals into at least one communication channel being characterized by generating an interference signal between the modulated, phase-offset carrier signals having a duration that is shorter than the constructive-interference signal.

7. The method of transmitting a CIMA communication signal recited in claim 1 wherein modulating (12) the carrier signals is performed in at least one predetermined time interval relative to the phase of the carriers, and combining (24) the modulated, phase-offset carrier signals being characterized by generating a signal having modulated carrier-signal components that occupy at least one nonzero-phase space and combine destructively in zero-phase space.

8. The method of transmitting a CIMA communication signal recited in claim 1 wherein generating (14n) a plurality of electromagnetic carrier signals includes providing the carriers with a tapered frequency-versus-amplitude window.

9. The method of transmitting a CIMA communication signal recited in claim 1 wherein combining (24) the modulated, phase-offset carrier signals includes coupling the carrier signals into at least one of a set of communication channels, including a waveguide and a free-space channel.

10. The method of transmitting a CIMA communication signal recited in claim 1 wherein providing the carriers with at least one predetermined phase space (16n) matches relative phases between the carriers to a dispersion profile of the carriers in a waveguide such that the dispersion causes the carrier phases to have a predetermined phase relationship after propagating a predetermined distance in the waveguide.

11. The method of transmitting a CIMA communication signal recited in claim 1 wherein combining (24) the modulated, phased carrier signals is characterized by coupling the carrier signals from an array of transmitter elements into the channel.

12. The method of transmitting a CIMA communication signal recited in claim 11 wherein each carrier signal associated with a particular user is transmitted from a different transmitter element, resulting in an array beam pattern being generated from a superposition of carrier signals transmitted by each of the transmitter elements.

13. The method of transmitting a CIMA communication signal recited in claim 11 wherein a separation between the transmitter elements is selected with respect to carrier-frequency separation to control the shape of the array beam pattern and the period in which the array beam pattern scans.

14. The method of transmitting a CIMA communication signal recited in claim 1 wherein modulating (12) and phase offsetting (16n) the carriers results in a train of pulses in the time domain modulated with a spread-spectrum code.

15. The method of transmitting a CIMA communication signal recited in claim 14 wherein the spread-spectrum code comprises an information signal and a pseudo-random CDMA spreading code.

16. The method of transmitting a CIMA communication signal recited in claim 1 wherein providing the carriers with at least one predetermined phase space (16n) produces at least two received constructive-interference pulses that overlap in time.

17. The method of transmitting a CIMA communication signal recited in claim 1 wherein providing the carriers with at least one predetermined phase space (16n) includes a decision step (66) that allows for at least two received constructive-interference pulses to overlap in time when the number of users or channel usage increases beyond a predetermined limit.

18. The method of communication recited in claim 17 wherein the decision step (66) includes assigning a priority to each of a plurality of users to determine which user signals overlap in time.

19. In a method of receiving Carrier Interference Multiple Access (CIMA) communication signals comprising receiving (52) at least one transmitted CIMA signal from at least one communication channel to produce a plurality of received multi-frequency carrier-signal components, the improvement comprising:
providing phase-space compensation to the carrier-signal components (60mn), each phase space corresponding to a data symbol mapped onto one of a plurality of pulse waveforms generated from a superposition of carriers and centered at a predetermined instant in time, the pulse waveforms being positioned substantially orthogonally in time, and
combining (62m) the multi-frequency carrier-signal components in phase to generate at least one constructive-interference signal indicative of at least one information signal.

20. The method of receiving CIMA communication signals recited in claim 19 wherein providing phase-space compensation to the carriers (60mn) includes providing at least one set of predetermined delays to each set of received carrier-signal components wherein the number of sets of predetermined delays is equal to a number of different phase spaces in which the received CIMA transmit signal is combined.

21. The method of receiving CIMA communication signals recited in claim 19 wherein combining (62m) the multi-frequency carrier-signal components includes providing channel compensation to the multi-frequency carrier-signal components.

22. The method of receiving CIMA communication signals recited in claim 21 wherein providing (60mn) at least one set of predetermined delays to each set of received carrier-signal components is performed by a frequency-shifted feedback cavity.

23. The method of receiving CIMA communication signals recited in claim 19 wherein combining (62m) the multi-frequency carrier-signal components in phase includes a multi-user detection step (66) in which interfering signals are weighted and combined with at least one intended user signal to cancel contributions of the multi-user interference to each intended user signal.

24. The method of receiving CIMA communication signals recited in claim 19 wherein receiving (52) at least one transmitted CIMA signal is adapted to receive at least one transmitted CIMA signal characterized by a plurality of frequency-hopped carrier signals.

25. A method of communication between at least one transmitter and at least one receiver comprising generating (14n) a plurality of electromagnetic carrier signals, the carrier signals having a plurality of frequencies, and modulating (12) the carrier signals with at least one information signal, the method characterized by:
providing the carriers with at least one predetermined phase space (16n), each phase space mapping a data symbol to one of a plurality of pulse waveforms generated from a superposition of the carriers and centered at a predetermined instant in time, the pulse waveforms being positioned substantially orthogonally in time,
combining (24) the modulated, phase-offset carrier signals in at least one communication channel to generate interference between the modulated, phase-offset carrier signals for providing at least one transmitted CIMA signal having a plurality of multi-frequency carrier-signal components,
receiving (52) the at least one transmitted CIMA signal from the at least one communication channel to produce a plurality of received multi-frequency carrier-signal components, combining (62m) the multi-frequency carrier-signal components in phase to generate at least one constructive-interference signal indicative of at least one information signal.

26. The method of communication between at least one transmitter and at least one receiver recited in claim 25 wherein generating (14n) a plurality of electromagnetic carrier signals having a plurality of frequencies further includes providing for frequency hopping of the carrier signals and receiving (52) the at least one transmitted CIMA signal includes providing for receiving a CIMA signal having a plurality of frequency-hopped carrier signals.

27. An electromagnetic-wave transmitter comprising a multicarrier generator (14n) capable of generating a plurality of electromagnetic carrier signals having a plurality of frequencies, and a carrier modulator (12) capable of modulating the carrier signals with at least one information signal, the improvement comprising:
 a phase-space controller (16n) adapted to provide the carriers with at least one predetermined phase space, each phase space mapping a data symbol to one of a plurality of pulse waveforms generated from a superposition of the carriers and centered at a predetermined instant in time, the pulse waveforms being positioned substantially orthogonally in time, and
 an output coupler (24) capable of combining the modulated, phased carriers in at least one communication channel to produce at least one CIMA signal having a plurality of carrier-signal components.

28. The electromagnetic-wave transmitter claimed in claim 27 wherein the output coupler (24) includes an array of transmitter elements.

29. The electromagnetic-wave transmitter claimed in claim 28 wherein each transmitter element is adapted to transmit a different carrier signal, thereby creating a time-dependent beam pattern.

30. The electromagnetic-wave transmitter claimed in claim 28 wherein each transmitter element is adapted to transmit a different carrier signal for each of a plurality of users, thereby creating a time-dependent beam pattern for each user.

31. The electromagnetic-wave transmitter claimed in claim 30 further characterized by a multi-frequency controller for controlling the multicarrier generator (14n) to adjust frequency separation of the carriers, thereby controlling the scan rate of each beam pattern.

32. The electromagnetic-wave transmitter claimed in claim 27 wherein the output coupler (24) includes a coupler to a waveguide.

33. The electromagnetic-wave transmitter claimed in claim 27 wherein the phase-space controller (16n) provides a plurality of incremental phase offsets to carrier signals that are uniformly separated in frequency.

34. The electromagnetic-wave transmitter claimed in claim 27 wherein the delay controller (16n) provides a plurality of incremental phase offsets to carrier signals that have uniform, but non-adjacent frequency spacing.

35. The electromagnetic-wave transmitter claimed in claim 27 further characterized by an amplitude-control system (18n) adapted to provide a tapered amplitude window to the carriers to reduce sidelobes.

36. The electromagnetic-wave transmitter claimed in claim 27 wherein the carrier modulator (12) is adapted to apply pulse-amplitude modulation to the carrier signals and the output coupler (24) is adapted to combine the modulated, phased carriers in the at least one communication channel to produce at least one pulse-amplitude modulated CIMA signal.

37. The electromagnetic-wave transmitter claimed in claim 36 wherein the output coupler (24) is adapted to combine the modulated, phased carriers in the at least one communication channel to produce CIMA signals.

38. The electromagnetic-wave transmitter claimed in claim 37 wherein the output coupler (24) is adapted to combine the modulated, phased carriers in the at least one communication channel to produce at least one CIMA signal whose carriers combine destructively in a zero-phase space of at least one other CIMA signal.

39. The electromagnetic-wave transmitter claimed in claim 27 wherein the phase-space controller (16n) is adapted to provide incremental phases to the carriers to match a chromatic dispersion profile of a waveguide for causing a predetermined phase relationship between the carriers to occur at a predetermined distance in the waveguide.

40. The electromagnetic-wave transmitter claimed in claim 27 wherein the phase-space controller (16n) is adapted to provide a plurality of incremental phases to the carriers to generate a train of pulses, the transmitter further characterized by an amplitude-control system (18n) for providing a predetermined amplitude to each carrier signal to modulate a spread-spectrum code onto the pulse train.

41. The electromagnetic-wave transmitter recited in claim 27 wherein the multicarrier generator (14n) is adapted to generate a plurality of frequency-hopped carrier signals.

42. An electromagnetic-wave receiver having a receiving element (52) capable of receiving transmitted multicarrier signals characterized by information modulated onto at least one phase space from a communication channel for providing at least one set of received multi-frequency carrier-signal components, the improvement comprising:
 a combiner (62mn) capable of combining the plurality of received multi-frequency carrier-signal components with respect to the at least one phase space to produce at least one constructive interference signal comprising at least one information signal modulated onto at least one of a plurality of pulse waveforms generated from a superposition of the at least one set of received multi-frequency carrier-signal components, the plurality of pulse waveforms being positioned substantially orthogonally in time.

43. The electromagnetic-wave receiver claimed in claim 42 wherein the receiver further comprises a phase-space compensator (60mn) adapted to phase shift the carriers relative to at least one phase space, each phase space corresponding to a data symbol mapped onto one of a plurality of pulse waveforms generated from a superposition of the carriers and centered at a predetermined instant in time, the pulse waveforms being positioned substantially orthogonally in time.

44. The electromagnetic-wave receiver claimed in claim 43 wherein the phase-space compensator (60mn) includes a frequency-shifted feedback cavity.

45. The electromagnetic-wave receiver claimed in claim 43 wherein the phase-space compensator (60mn) is adapted to sample within at least one predetermined time interval to detect at least one constructive interference signal in at least one zero-phase space.

46. The electromagnetic-wave receiver claimed in claim 45 further comprising a signal estimator (66) adapted to estimate the at least one information signal from a plurality of samples in a plurality of phase spaces.

47. The electromagnetic-wave receiver claimed in claim 42 further comprising a signal estimator (66) adapted to sample one or more interfering user signals that interfere with an intended user's signal, weight the sampled interfering signals, and combine the sampled interfering signals with the intended user's signal to cancel multi-user interference.

48. The electromagnetic-wave receiver claimed in claim 42 wherein the combiner (62m) is adapted to provide gain adjustment to at least one of the carrier-signal components to compensate for flat fading.

49. The electromagnetic-wave receiver recited in claim 42 wherein the receiving element (52) is adapted to receive transmitted multicarrier frequency-hopped signals.

50. A carrier-interference multiple-access (CIMA) communication system comprising:
- an electromagnetic-wave transmitter comprising a multicarrier generator (14*n*) capable of generating a plurality of electromagnetic carrier signals having a plurality of frequencies, and a carrier modulator (12) capable of modulating the carrier signals with at least one information signal, the improvement comprising:
- a phase-space controller (16*n*) adapted to provide the carriers with at least one predetermined phase space, each phase space mapping a data symbol to one of a plurality of pulse waveforms generated from a superposition of the carriers and centered at a predetermined instant in time, the pulse waveforms being positioned substantially orthogonally in time,
- an output coupler (24) capable of combining the modulated, phased carriers in at least one communication channel to produce at least one CIMA signal having a plurality of carrier-signal components, and
- an electromagnetic-wave receiver having a receiving element (52) capable of receiving transmitted signals from a communication channel for providing at least one set of received multi-frequency carrier-signal components, the improvement comprising:
- a combiner (62*mn*) capable of combining the plurality of received multi-frequency carrier-signal components in phase to produce at least one constructive interference signal indicative of at least one information signal.

51. The CIMA communication system recited in claim 50 wherein the multicarrier generator (14*n*) is adapted to generate a plurality of frequency-hopped carrier signals and the receiving element (52) is adapted to receive transmitted multicarrier frequency-hopped signals.

52. In a method for generating at least one spread-spectrum signal having at least one predetermined time-domain characteristic, the method comprising generating a plurality of carrier signals, the improvement comprising:
- providing the carrier signals with at least one predetermined phase space (16*n*), each phase space corresponding to at least one pulse waveform generated from a superposition of the carriers and centered at a predetermined instant in time,
- providing at least one predetermined gain profile to the carrier signals (18*n*) to shape the at least one pulse waveform, and
- combining (20) the at least one pulse waveform having the at least one predetermined time-domain characteristic.

53. The method for generating at least one spread-spectrum signal claimed in claim 52 wherein at least one of providing the carrier signals with at least one predetermined phase space (16*n*), providing at least one predetermined gain profile to the carrier signals (18*n*), and combining (20) the carrier signals is adapted to generate a direct-sequence code division multiple access signal.

54. The method for generating at least one spread-spectrum signal claimed in claim 52 wherein providing at least one predetermined gain profile (18*n*) to the carrier signals includes modulating an information signal onto the carrier signals.

55. The method for generating at least one spread-spectrum signal claimed in claim 52 wherein generating a plurality of carrier signals further includes providing for frequency hopping the carrier signals.

56. A spread-spectrum signal generator comprising a multicarrier generator (14*n*) capable of generating a plurality of electromagnetic carrier signals having a plurality of frequencies, the improvement comprising:
- a phase-space controller (16*n*) capable of applying a plurality of incremental phase offsets to the carrier signals for providing the carrier signals with a predetermined phase space at a predetermined time interval,
- a gain controller (18*n*) capable of providing a predetermined gain profile to the carrier signals, and
- a combiner (20) capable of combining the modulated, phased carriers to produce a spread spectrum signal from at least one superposition of the carrier signals.

57. The spread-spectrum signal generator claimed in claim 56 wherein the phase-space controller (16*n*) and the gain controller (18*n*) are adapted to provide phase offsets and a gain profile, respectively, that provides the superposition of the carrier signals with a direct-sequence spread-spectrum signal.

58. The spread-spectrum signal generator claimed in claim 56 wherein the multicarrier generator (14*n*) is adapted to provide for frequency hopping of the plurality of electromagnetic carrier signals.

59. A method of processing a received multi-carrier signal representing a plurality of symbols and including a plurality of carriers, a subset of said plurality of carriers being allocated to at least one user, the method including:
- providing for performing a time domain to frequency domain transform operation on the plurality of carriers to generate a frequency-domain signal therefrom;
- providing for filtering the frequency-domain signal to remove at least one carrier in said plurality of carriers that are not included in said subset of carriers;
- performing a frequency domain to time domain transform operation on the filtered frequency-domain signal to generate a filtered time-domain signal; and
- recovering symbols transmitted to the at least one user from the filtered time-domain signal.

60. The method of processing a received multi-carrier signal recited in claim 59 wherein the plurality of carriers includes frequency-hopped carriers.

61. A method of processing at least one received multi-carrier signal to generate at least one data-symbol value, the at least one received multicarrier signal comprising at least two data symbols encoded on at least one common subcarrier and occupying at least one common symbol period simultaneously, the method including;
- providing for performing a channel-compensation operation on the at least one received multicarrier signal; and
- providing for mapping values of the received multicarrier signal after channel compensation at instants in time used to transmit the at least one data-symbol value.

62. The method of processing at least one received multicarrier signal recited in claim 61 wherein the multicarrier signal includes frequency-hopped carriers.

63. A method of receiving at least one data symbol spread by at least one carrier interferometry (CI) code across a plurality of multi-frequency carriers, the at least one CI code configured to map the at least one data symbol to at least one pulse waveform produced by a superposition of the plurality of multi-frequency carriers and centered at a predetermined instant in time, the method including:
- providing for selecting a plurality of received multi-frequency carriers within a predetermined bandwidth;
- providing for generating at least one received pulse waveform from a superposition of selected multi-frequency carriers; and providing for estimating the at least one data symbol impressed on the at least one received pulse waveforms.

64. The method of receiving at least one Carrier Interferometry signal recited in claim 63 wherein providing for selecting a plurality of received carriers includes selecting a plurality of received frequency-hopped carriers.

65. A receiver adapted to receive at least one data symbol spread by at least one carrier interferometry (CI) code across a plurality of multi-frequency carriers the at least one CI code configured to map the at least one data symbol to at least one pulse waveform produced by a superposition of the plurality of multi-frequency carriers and centered at a predetermined instant in time, the receiver including:
- a filter adapted to select a predetermined set of received multi-frequency carriers;
- a combiner coupled to the filter, the combiner adapted to combine the received multi-frequency carriers to produce at least one modulated pulse waveform; and
- a decision device coupled to the combiner, the decision device adapted to generate at least one estimate of the at least one data symbol from the at least one modulated pulse waveform.

66. The receiver recited in claim 65 wherein the filter is adapted to select a predetermined set of received frequency-hopped carriers.

67. A receiver adapted to receive at least one data symbol spread by at least one carrier interferometry (CI) code across a plurality of multi-frequency carriers, the at least one CI code configured to map the at least one data symbol to at least one pulse waveform produced by a superposition of the plurality of multi-frequency carriers and centered at a predetermined instant in time, the receiver including:
- a filter adapted to select a predetermined set of received multi-frequency carriers;
- a combiner coupled to the filter, the combiner adapted to optimally combine the set of received multi-frequency carriers in the presence of at least one of interference and multipath to generate at least one signal indicative of a modulated pulse waveform; and
- a decision device coupled to the combiner, the decision device adapted to generate at least one estimate of the at least one data symbol from the at least one signal indicative of the modulated pulse waveform.

68. The receiver recited in claim 67 wherein the filter is adapted to select a predetermined set of received frequency-hopped carriers.

69. An apparatus for receiving a frequency division multiplexed signal representing a plurality of symbols and including a plurality of carriers, a subset of said plurality of carriers being allocated to at least one user, the apparatus including:
- a time to frequency domain transform module adapted to generate a frequency-domain signal from the frequency division multiplexed signal;
- a filter adapted to filter at least one carrier from the frequency domain signal other than those included in the subset to thereby generate a filtered frequency-domain signal;
- a frequency to time domain transform module adapted to perform a frequency domain to time domain transform operation on the filtered frequency-domain signal to thereby generate a time-domain signal; and
- a decision module coupled to the frequency to time domain transform module for mapping received signal values at points in time to estimated symbol values.

70. The apparatus recited in claim 69 wherein the plurality of carriers includes at least one set of frequency-hopped carriers.

71. A multicarrier signal receiver adapted to receive at least one multicarrier signal, the receiver including:
- a channel-compensation module adapted to perform a channel compensation operation on the multicarrier signal; and
- a decision module adapted to map values of the multicarrier signal after channel compensation at instants in time used to transmit symbol values, the multicarrier signal comprising the symbol values modulated onto at least one of a plurality of pulse waveforms generated from a superposition of the at least one set of received multi-frequency carrier-signal components, each of the pulse waveforms being centered at a predetermined instant in time.

72. The multicarrier signal receiver recited in claim 71 wherein at least one of the channel-compensation module and the decision module is adapted to process the multicarrier signal wherein the multicarrier signal includes at least one set of frequency-hopped carriers.

73. A method of generating a multicarrier communication signal transmitted by a communication device, the method including:
- providing a symbol duration having equally spaced time instants;
- allocating a predetermined set of carrier frequencies to the communication device;
- receiving as input data, data symbols to be transmitted by the multicarrier communication signal;
- mapping the data symbols to the equally spaced time instants in the symbol duration to generate a discrete signal of mapped symbols; and
- spreading the data symbols over the predetermined set of carrier frequencies by applying a pulse function to the discrete signal, the pulse function comprising a superposition of the predetermined set of carrier frequencies.

74. The method of generating a multicarrier communication signal recited in claim 73 wherein generating a superposition signal provides the frequency response of the superposition signal with frequency-hopped sinusoids.

75. A method for generating a multicarrier communication signal having carrier frequencies distributed over a predetermined bandwidth, the method including:
- providing for defining a symbol duration for the multicarrier communication signal;
- providing for defining a plurality of time instants in the symbol duration;
- providing for allocating a set of carrier frequencies from the carrier frequencies distributed over the predetermined bandwidth to a particular communication device;
- providing for receiving as input, data symbols from a data source;
- providing for mapping the data symbols to the time instants to generate a discrete signal in the time domain; and
- providing for spreading the data symbols over the set of carrier frequencies by applying pulse functions to the discrete signal, the pulse functions comprising a superposition of the set of carrier frequencies.

76. The method of generating a multicarrier communication signal recited in claim 75 wherein providing for allocating a set of carrier frequencies is adapted to provide for frequency hopping of the carrier frequencies.

77. A method of generating at least one Carrier Interferometry signal comprising data spread over a plurality of multi-frequency carriers, the method including:
provproviding for selecting a plurality of multi-frequency carriers within a predetermined bandwidth;
providing for generating at least one pulse waveform, each of the at least one pulse waveform comprising a superposition of the selected multi-frequency carriers;
providing for accepting at least one information symbol; and
providing for spreading the at least one information symbol over the selected multi-frequency carriers by modulating the at least one information symbol onto the at least one pulse waveform.

78. The method of generating Carrier Interferometry signals recited in claim 77 wherein providing for selecting a plurality of carriers further includes providing for frequency hopping of the plurality of carriers.

79. A transmitter adapted to generate at least one Carrier Interferometry signal, including:
a carrier generator adapted to generate a plurality of multi-frequency carriers within a predetermined bandwidth;
a pulse generator coupled to the carrier generator, the pulse generator adapted to produce at least one pulse waveform comprising a superposition of selected multi-frequency carriers; and
a modulator coupled to the pulse generator, the modulator adapted to spread an information symbol across the selected multi-frequency carriers to produce at least one information-modulated pulse waveform.

80. The transmitter recited in claim 79 wherein the carrier generator is adapted to provide for frequency hopping the plurality of carriers.

81. A transmitter adapted to spread an information symbol across a plurality of multi-frequency carrier components characterized by a CI code configured to map the information symbol to at least one pulse waveform characterized by a superposition of the plurality of multi-frequency carrier components and centered at a predetermined instant in time, the transmitter including:
a pulse generator adapted to produce the at least one pulse waveform; and
a modulator coupled to the pulse generator, the modulator adapted to spread the information symbol across the plurality of multi-frequency carrier components.

82. The transmitter recited in claim 81 wherein the pulse generator is adapted to provide for frequency hopping the plurality of carrier components.

83. A communication system adapted to generate a multicarrier signal having carrier frequencies distributed over a predetermined bandwidth, the communication system including:
a carrier generator adapted to generate an allocated carrier set selected from carrier frequencies distributed over the predetermined bandwidth;
an interval delay circuit adapted to provide a plurality of information symbols to prescribed time instants in a symbol duration to generate a discrete signal of symbols; and
a pulse-generation circuit adapted to spread each of the plurality of information symbols across the allocated carrier set to generate a pulse sequence by applying predetermined pulse functions to the discrete signal, the pulse functions characterized by a superposition of carrier frequencies in the allocated carrier set, the pulse functions configured for operating on the discrete signal such that values of the pulse sequence at the prescribed time instants are equal to the information symbols, and a frequency response of the pulse sequence includes sinusoids having non-zero values at frequencies within the allocated carrier set and zero values at the remaining frequencies.

84. The communication system recited in claim 83 wherein the pulse-generation circuit is further adapted to provide frequency hopping to the frequency response of the pulse sequence.

85. A communication system adapted to generate a multicarrier signal having allocated carrier frequencies distributed over a predetermined bandwidth, the communication system including:
an interval delay circuit adapted to receive a plurality of data symbols and map the symbols to a plurality of prescribed time instants in at least one symbol duration to generate a discrete signal of mapped symbols; and
a pulse generator adapted to spread each of the plurality of data symbols across the allocated carrier frequencies to generate a pulse train by applying a pulse function to the discrete signal, the pulse function characterized by a superposition of the allocated carrier frequencies.

86. The communication system recited in claim 85 further adapted to provide the allocated frequencies with frequency hopping.

87. A communication system configured for generating a multicarrier signal having allocated carrier frequencies distributed over a predetermined bandwidth, the communication system including:
an interval delay circuit adapted to receive a plurality of data symbols and map the symbols to a plurality of prescribed time instants in at least one symbol duration to generate a discrete signal of mapped symbols; and
a pulse generator adapted to spread each of the plurality of data symbols across the allocated carrier frequencies by applying a pulse function comprising a superposition of the allocated carrier frequencies to the discrete signal wherein the pulse function operates on the discrete signal such that values of the pulse train at the prescribed time instants are equal to the mapped symbols.

88. The communication system recited in claim 87 wherein the pulse generator is adapted to frequency hop the allocated carrier frequencies.

89. A communication system adapted to generate a multicarrier signal having a set of carrier frequencies distributed over a predetermined bandwidth, the communication system including:
a data source adapted to process a plurality of information symbols to generate a set of data symbols with a predetermined set of phase relationships and amplitude profiles to provide a superposition of the carriers with orthogonality in time; and
a Fourier-transform circuit coupled to the data source, the Fourier-transform circuit adapted to perform an inverse Fourier transform of the data symbols to produce a digital time-domain superposition signal characterized by data symbols mapped to orthogonal pulses.

90. The communication system recited in claim 89 further adapted to frequency hop the set of carrier frequencies.

91. The method of transmitting a CIMA communication signal recited in claim 1 wherein generating (14$n$) a plurality of electromagnetic carrier signals having a plurality of frequencies further includes providing for frequency hopping of the carrier signals.

* * * * *